United States Patent [19]

Mark et al.

[11] Patent Number: 4,463,161

[45] Date of Patent: Jul. 31, 1984

[54] POLYARYLATE COMPOSITIONS

[75] Inventors: Victor Mark, Evansville; Charles V. Hedges, Mt. Vernon, both of Ind.

[73] Assignee: General Electric Company, Mt. Vernon, Ind.

[21] Appl. No.: 452,906

[22] Filed: Dec. 27, 1982

[51] Int. Cl.$^3$ .............................................. C08G 63/18
[52] U.S. Cl. .................................... 528/176; 528/125; 528/128; 528/173; 528/191; 528/193; 528/194
[58] Field of Search ............... 528/125, 128, 173, 176, 528/191, 193, 194

[56]  References Cited

U.S. PATENT DOCUMENTS

| 3,317,464 | 5/1967 | Conix | 528/176 |
| 3,351,624 | 11/1967 | Conix | 528/176 |
| 3,498,950 | 3/1970 | Shatz et al. | 528/176 |
| 4,294,956 | 10/1981 | Berger et al. | 528/176 |

Primary Examiner—Lester L. Lee
Attorney, Agent, or Firm—Martin B. Barancik; Myron B. Kapustij

[57] ABSTRACT

Polyarylate resins derived from (i) an aromatic dicarboxylic acid; and (ii) a branched alkylidene dihydric phenol, wherein branching occurs on a carbon atom of the alkylidene radical which is at least one carbon atom removed from the benzylic carbon atom bridging the two phenolic residues.

11 Claims, No Drawings

POLYARYLATE COMPOSITIONS

Polyarylates are high molecular weight thermoplastic resins which, due to their many advantageous properties, are finding increasing use as engineering thermoplastic materials in many commercial and industrial applications. Polyarylates are generally linear aromatic polymers containing repeating aromatic ester structural units in the polymer chain. The polyarylates are in general derived from dihydric phenols and aromatic dicarboxylic acids or their reactive derivatives.

While conventional polyarylates are quite suitable for a wide variety of uses, there nevertheless exists a need for polyarylates exhibiting a greater degree of ductility and impact strength than possessed by the conventional polyarylates; especially for polyarylates exhibiting improved impact strength and ductility and yet possessing heat resistance substantially comparable to that exhibited by conventional polyarylates.

It is an object of the instant invention to provide polyarylates which exhibit higher impact strengths and ductilities than conventional polyarylates. It is another object of the instant invention to provide polyarylates which exhibit improved ductility and impact strength while exhibiting a heat resistance which is generally comparable, to a substantial degree, to conventional polyarylates.

SUMMARY OF THE INVENTION

The instant invention is directed to novel polyarylates exhibiting improved impact strength and ductility. These polyarylates are derived from an aromatic dicarboxylic acid and a branched alkylidene dihydric phenol, wherein the branching occurs on a carbon atom which is at least one carbon atom removed from the benzylic carbon atom bridging the two phenolic residues.

DESCRIPTION OF THE INVENTION

In accordance with the instant invention there are provided polyarylate resins exhibiting improved impact strengths and ductilities as compared to conventional polyarylate resins. The polyarylates of the instant invention are prepared by reacting (i) at least one aromatic dicarboxylic acid or a reactive derivative thereof, with (ii) at least one branched alkylidene dihydric phenol.

The branched alkylidene dihydric phenols utilized in preparing the instant polyarylates are represented by the general formula

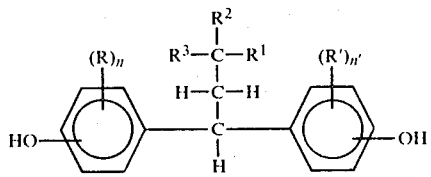

wherein:
R is independently selected from halogen radicals and monovalent hydrocarbon radicals;
R' is independently selected from halogen radicals and monovalent hydrocarbon radicals;
$R^1$ is selected from hydrogen and alkyl radicals;
$R^3$ is selected from hydrogen and alkyl radicals;
$R^2$ is selected from alkyl radicals, with the proviso that if $R^1$ and $R^3$ are both hydrogen then $R^2$ is selected from branched alkyl radicals containing at least 3 carbon atoms; and
n and n' are independently selected from whole numbers having a value of from 0 to 4 inclusive.

The preferred halogen radicals represented by R and R' are chlorine and bromine.

The monovalent hydrocarbon radicals represented by R and R' are selected from alkyl radicals, aryl radicals, aralkyl radicals, alkaryl radicals, and cycloalkyl radicals.

The preferred alkyl radicals represented by R and R' are those containing from 1 to about 8 carbon atoms. These preferred alkyl radicals can be either straight chain alkyl radicals or branched alkyl radicals. Some illustrative non-limiting examples of these alkyl radicals include methyl, ethyl, propyl, isopropyl, butyl, tertiary butyl, pentyl, isopentyl, neopentyl, and the like.

The preferred aryl radicals represented by R and R' are those containing from 6 to 12 carbon atoms. These include phenyl, naphthyl and biphenyl.

The preferred aralkyl and alkaryl radicals represented by R and R' are those containing from 7 to about 14 carbon atoms. Some illustrative non-limiting examples of these aralkyl and alkaryl radicals include tolyl, xylyl, ethylphenyl, and the like.

The preferred cycloalkyl radicals represented by R and R' are those containing from 4 to about 6 ring carbon atoms. Some illustrative non-limiting examples of these cycloalkyl radicals include cyclobutyl, cyclopentyl, cyclohexyl, methylcyclohexyl, and the like.

When more than one R substituent is present on the ring carbon atoms of the aromatic residue, i.e. when n is more than one, they may be the same or different. The same is true for the R' substituent. When n and/or n' are zero then only hydrogens are present on the ring carbon atoms of the aromatic residue.

The preferred monovalent hydrocarbon radicals represented by R and R' are the alkyl radicals.

The preferred alkyl radicals represented by $R^1$ and $R^3$ are those containing from 1 to about 10 carbon atoms. These alkyl radicals can be either straight chain alkyl radicals or branched alkyl radicals. Some illustrative non-limiting examples of these alkyl radicals include methyl, ethyl, propyl, isopropyl, butyl, isobutyl, tertiarybutyl, pentyl, isopentyl, neopentyl, and hexyl.

The preferred alkyl radicals represented by $R^2$ are those containing from 1 to about 20 carbon atoms. If at least one of $R^1$ and $R^3$ is an alkyl radical, then the alkyl radicals represented by $R^1$ may be either straight chain or branched alkyl radicals. If, however, both $R^1$ and $R^3$ are hydrogen, then the alkyl radicals represented by $R^2$ must be branched alkyl radicals containing from 3 to about 20 carbon atoms. Some illustrative non-limiting examples of straight chain alkyl radicals represented by $R^2$ include methyl, ethyl, propyl, pentyl, heptyl, decyl, dodecyl, penatdecyl, and hexadecyl. Some illustrative non-limiting examples of branched alkyl radicals containing at least three carbon atoms represented by $R^2$ include isopropyl, isobutyl, tertiarybutyl, neopentyl, 4,4-dimethylhexyl, 4-propylhexyl, 3-methyl-4-ethylheptyl, 12-methyltetradecyl, 13-methyltetradecyl, 10-methyltetradecyl, 8,8-dimethyldecyl, 4-butyloctyl, 2,3-dimethylbutyl, 5-methyl-4-propylhexyl, and 5-propyloctyl.

The preferred dihydric phenols of Formula I are the 4,4'-dihydric phenols.

Some illustrative non-limiting examples of the dihydric phenols represented by Formula I include:

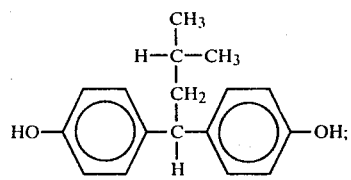

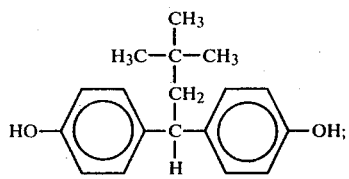

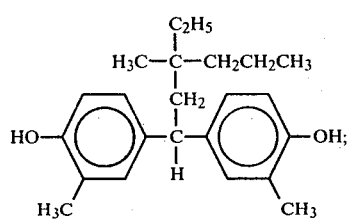

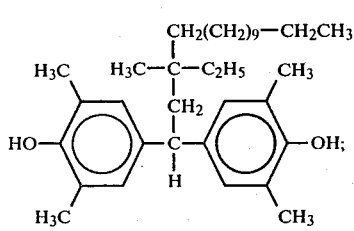

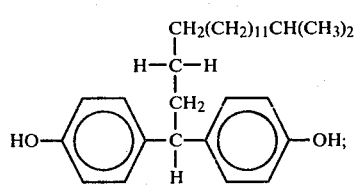

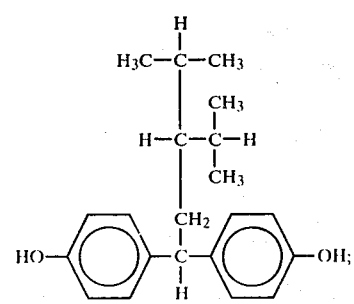

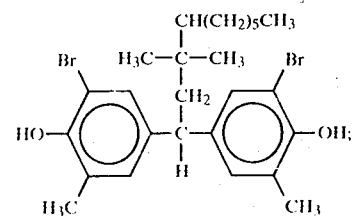

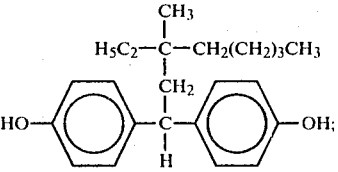

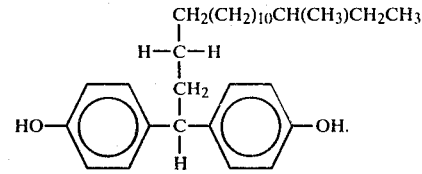

These dihydric phenols, as well as their preparation, are more fully disclosed in copending U.S. application of Mark and Hedges, Serial Number 453,104, filed on the same day as the instant application, which is incorporated herein by reference.

Briefly stated, the dihydric phenols of Formula I are prepared by coreacting a particular aldehyde with a phenol in the presence of a catalytic amount of an acid catalyst. The particular aldehyde reactant is represented by the general formula

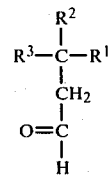   II.

wherein $R^1$, $R^2$ and $R^3$ are as defined hereinafore.

The phenol reactant is represented by the general formulae

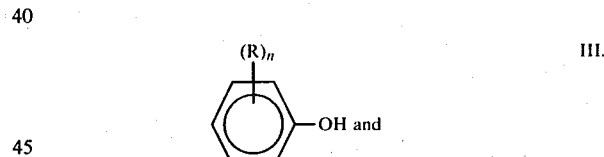   III.

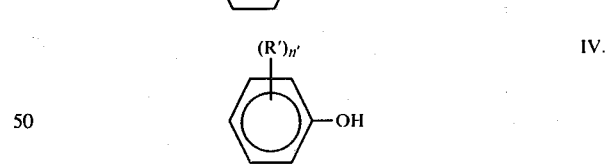   IV.

wherein R, R', n and n' are as defined hereinafore.

In order to obtain the dihydric phenols of Formula I, one mole of an aldehyde of Formula II is reacted with one mole of a phenol of Formula III and one mole of a phenol of Formula IV.

The phenols of Formulae III and IV may be the same. In such case one mole of the aldehyde of Formula II is reacted with two moles of the phenol. It is often advantageous to utilize an excess of the phenol reactant and to recover or remove the untreated phenol at the end of the reaction.

In the preparation of the polyarylates of the instant invention only one dihydric phenol of Formula I may be employed or a mixture of two or more different dihydric phenols of Formula I may be utilized.

The aromatic dicarboxylic acids which are reacted with at least one dihydric phenol of Formula I to produce the polyarylates of the instant invention are well known and are generally commercially available or may be readily prepared by known methods. In general, any aromatic dicarboxylic acid conventionally used in the preparation of polyesters may be utilized. These aromatic dicarboxylic acids may be represented by the general formula HOOC—Ar—COOH   V.

wherein Ar is selected from divalent aromatic radicals, preferably those containing from 6 to about 18 carbon atoms, such as phenylene, naphthylene, biphenylene, substituted phenylene, substituted biphenylene, and the like. These divalent aromatic radicals, when substituted, are preferably substituted with monovalent hydrocarbon radicals and halogen radicals, preferably chlorine and bromine. The monovalent hydrocarbon radicals are the same as those defined for R and R' hereinafore. In Formula V Ar may also be selected from divalent radicals of the type —AR'—R$^4$—Ar'— wherein Ar' is independently selected from divalent aromatic radicals of the type described for Ar, and R$^4$ is selected from alkylene radicals containing from 2 to about 6 carbon atoms and alkylidene radicals containing from 1 to about 6 carbon atoms.

Preferred aromatic dicarboxylic acids of Formula V are those represented by the general formula

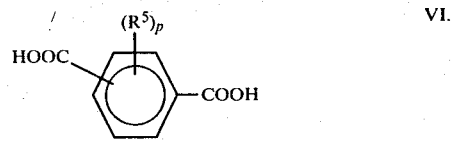

wherein R$^5$ is independently selected from alkyl radicals, preferably those containing from 1 to about 6 carbon atoms; and halogen radicals, preferably chlorine and bromine. In Formula VI p represents a whole number having a value of from 0 to 4 inclusive. In Formula VI when more than one R$^5$ substituent is present, they may be the same or different.

Some particularly useful aromatic dicarboxylic acids of Formula VI include isophthalic acid, terephthalic acid, and mixtures thereof.

Instead of using the aromatic dicarboxylic acids per se it is possible, and sometimes even preferred, to utilize their respective reactive derivatives. Particularly useful reactive derivatives of the aromatic dicarboxylic acids are the acid halides, with the acid chlorides being the preferred acid halides. Thus, for example, instead of using isophthalic acid, terephthalic acid, or mixtures thereof, it is possible to employ isophthaloyl dichloride, terephthaloyl dichloride, or mixtures thereof.

In the preparation of the instant polyarylates only one particular aromatic dicarboxylic acid may be employed, or a mixture of two or more of these acids, or their reactive derivatives, may be employed.

The preparation of the instant polyarylates utilizing the instant dihydric phenols and the aromatic dicarboxylic acids or their reactive derivatives may be accomplished by known methods such as, for example, heterogeneous interfacial polymerization, solution condensation polymerization, and melt condensation polymerization.

Most conveniently, the instant polyarylates may be prepared from equimolar or nearly equimolar amounts of (i) at least one dihydric phenol of Formula I, and (ii) at least one aromatic dicarboxylic acid or a reactive derivative thereof, by the heterogeneous interfacial polymerization technique. In accordance with the usual heterogeneous interfacial polymerization procedure the reactants are present in different liquid phases which are immiscible and which, in the preparation of the present polymers, constitute two solvent media. Thus, the dihydric phenol is dissolved in one solvent medium, the aromatic dicarboxylic acid or its reactive derivative is dissolved in a second solvent medium immiscible with the first, and the solutions are combined. Normally, an alkaline aqueous medium serves as the solvent for the dihydric phenol and an organic solvent is utilized for the acid, said organic solvent being so chosen that it either dissolves the polyarylate produced or serves as a swelling medium therefor. Also present during the reaction are catalysts and chain-terminators or molecular weight regulators.

The catalysts which can be employed may be any of the well known catalysts that aid the interfacial polymerization reaction of the dihydric phenol with the aromatic dicarboxylic acid or its reactive derivative. Suitable catalysts include, but are not limited to, tertiary amines such as triethylamine, quaternary ammonium compounds, and quaternary phosphonium compounds.

The molecular weight regulators employed may be any of the well known compounds that regulate the molecular weight of the polyarylates by a chain terminating mechanism. These compounds include, but are not limited to, phenol, tertiarybutyl phenol, and chroman-I.

The temperature at which the polymerization reaction proceeds may vary from below 0° C. to above 100° C. The polymerization reaction proceeds satisfactorily at temperatures from room temperature (25° C.) to about 50° C.

The polyarylates of the instant invention generally have a weight average molecular weight in the range of from about 5,000 to about 200,000, preferably from about 10,000 to about 100,000.

The instant polyarylates exhibit a broad spectrum of properties. These properties range from high impact strengths, high ductility, and elastomeric characteristics at one end of the spectrum, to impact strengths and ductilities which are improved over those possessed by conventional polyarylates (e.g., polyarylates derived from bisphenol-A), and heat resistances (as exemplified by second order glass transition temperature, Tg) generally comparable, to a substantial degree, to those exhibited by conventional polyarylates, at the other end of the spectrum. Thus, for example, at one end of the spectrum are the properties exhibited by polyarylates of the instant invention where R$^1$ and R$^3$ are both hydrogen and R$^2$ is a relatively long chain branched alkyl radical. The polyarylates utilizing this type of dihydric phenol of Formula I will exhibit high impact strength, high ductility, and elastomeric characteristics (exemplified, in part, by relatively low Tg). At the other end of the spectrum are the properties exhibited by polyarylates derived from dihydric phenols of Formula I wherein R$^1$, R$^2$ and R$^3$ are all relatively short chain alkyl radicals. These polyarylates exhibit improved impact strength and ductility as compared to conventional polyarylates such as those derived from bisphenol-A, and heat resistance which is generally comparable, to a substantial degree, to conventional polyarylates.

As has been discussed above, the polyarylates of the instant invention exhibit many and various properties. Such being the case, a particular arylate polymer may be selected to especially suit a given use or intended purpose. Thus the arylate polymers of the instant invention, because of their myriad properties, may respectively fit a multiformity of specific usages.

The polyarylates of the instant invention may optionally have admixed therewith the commonly known and used additives such as antioxidants; antistatic agents; fillers such as glass fibers, talc, mica, and clay; ultraviolet radiation absorbers such as the benzophenones, benzotriazoles and cyanoacrylates; hydrolytic stabilizers such as the epoxides disclosed in U.S. Pat. Nos. 3,489,716, 3,138,379 and 3,839,247, all of which are incorporated herein by reference; color stabilizers such as the organophosphites; flame retardants; and the like.

Some particularly useful flame retardants are the alkali and alkaline earth metal salts of sulfonic acids. These types of flame retardants are disclosed in U.S. Pat. Nos. 3,933,734; 3,948,851; 3,926,908; 3,919,167, 3,909,490; 3,953,396; 3,931,100; 3,978,024; 3,953,399; 3,917,559; 3,951,910 and 3,940,366, all of which are incorporated herein by reference.

Also contemplated as falling with the scope of the instant invention are arylate polymers derived from (i) at least one dihydric phenol of Formula I, (ii) at least one aromatic dicarboxylic acid or a reactive derivative thereof, and (iii) at least one conventional dihydric phenol. The conventional dihydric phenols are well known in the prior art and are amply disclosed therein. These conventional dihydric phenols are either commercially available or may readily be prepared by known methods. Some illustrative non-limiting examples of these conventional dihydric phenols include:
1,1-bis(4-hydroxyphenyl)ethane;
2,2-bis(4-hydroxyphenyl)propane (bisphenol-A);
2,2-bis(4-hydroxy-3-methylphenyl)propane;
2,2-bis(4-hydroxy-3-chlorophenyl)propane;
1,1-bis(4-hydroxyphenyl)cyclohexane;
p,p'-dihydroxydiphenyl;
3,3'-dichloro-4,4-'dihydroxydiphenyl; and the like.

The instant invention also encompasses blends comprised of (i) at least one polyarylate resin of the instant invention, and (ii) at least one conventional polyarylate resin. The conventional polyarylate resins used to form the instant blends are derived from an aromatic dicarboxylic acid or a reactive derivative thereof and a conventional dihydric phenol of the type discussed hereinafore.

DESCRIPTION OF THE PREFERRED EMBODIMENT

In order to more fully and clearly illustrate the present invention the following examples are set forth. It is intended that the examples be considered as illustrative rather than limiting the invention as disclosed and claimed herein. In the examples all parts and percents are on a weight basis, unless otherwise indicated.

The following example illustrates the preparation of a dihydric phenol of Formula I.

EXAMPLE 1

This example illustrates the preparation of 4,4'-(3-methylbutylidene)bisphenol.

Into a 1 liter glass reactor, equipped with a stirrer, reflux condenser, thermometer and gas-inlet tube, were charged 752.6 grams (8.0 moles) of phenol and 68.9 grams (0.8 mole) of isovaleraldehyde. The phenol was melted by the application of heat to the reactor via a heating mantel. Into the well stirred solution was introduced, slowly, hydrogen chloride gas. The heating mantel was replaced with an ice-water bath which was used to keep the temperature of the ensuing exothermic reaction between 30° and 36° C. After about 30 minutes, the introduction of hydrogen chloride was terminated and the clear, red reaction mixture was sampled for gas chromatographic analysis. This indicated that all of the starting aldehyde had reacted. Excess phenol was stripped off in a water aspirator vacuum and the residue crystallized with charcoaling from benzene. The white crystals were analyzed by gas chromatography, which indicated the following compositions: 2,2'-isomer, 0.6%; 2,4'-isomer, 6.8%; 4,4'-(3-methylbutylidene)bisphenol, 91.4%. One more recrystallization increased the 4,4'-isomer content to 97.0%, which had a melting point of 153°–154° C.

The following example illustrates the preparation of a polyarylate of the instant invention.

EXAMPLE 2

To a slurry of 5.1 grams (0.02 mole) of 4,4'-(3-methylbutylidene)bisphenol prepared substantially in accordance with the procedure of Example 1, 0.06 milliliters (2 mole %) of triethylamine, 0.02 gram (1 mole %) of phenol, 400 milliliters of methylene chloride, and 300 milliliters of water, there was added enough 25% aqueous sodium hydroxide solution to raise the pH to 12. Then, a solution of 4.1 grams (0.02 mole) of isophthaloyl dichloride in 30 milliliters of methylene chloride was added during a 30 minute period with stirring while maintaining the pH at 11.0 to 11.4 by the addition of the aqueous sodium hydroxide solution.

The methylene chloride phase was separated, washed with 0.01N hydrochloric acid, followed by a washing with deionized water, and the organic layer was separated and dried by silica gel. The polymer was precipitated by the addition of excess methanol. The polymer had an intrinsic viscosity in methylene chloride at 25° C. of 0.263 dl/gm and a second order glass transition temperature (Tg) of 168.2° C.

Obviously, other modifications and variations of the present invention are possible in light of the above teachings. It is, therefore, to be understood that changes may be made in the particular embodiment of the invention described which are within the full intended scope of the invention defined by the appended claims.

What is claimed is:
1. Polyarylate resin prepared by reacting
(i) at least one aromatic dicarboxylic acid or a reactive derivative thereof; and
(ii) at least one dihydric phenol represented by the general formula

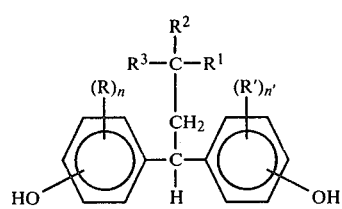

wherein:
- R is independently selected from halogen radicals and monovalent hydrocarbon radicals;
- R' is independently selected from halogen radicals and monovalent hydrocarbon radicals;
- $R^1$ is selected from hydrogen and alkyl radicals;
- $R^3$ is selected from hydrogen and alkyl radicals;
- $R^2$ is selected from alkyl radicals, with the proviso that if both $R^1$ and $R^3$ are hydrogen then $R^2$ is selected from branched alkyl radicals containing at least three carbon atoms; and
- n and n' are independently selected from whole numbers having a value of from 0 to 4 inclusive.

2. The resin of claim 1 wherein said monovalent hydrocarbon radicals are selected from alkyl radicals, aryl radicals, alkaryl radicals, aralkyl radicals, and cycloalkyl radicals.

3. The resins of claim 2 wherein said monovalent hydrocarbon radicals are selected from alkyl radicals.

4. The resin of claim 3 wherein said dihydric phenol is a 4,4'-dihydric phenol.

5. The compositions of claim 4 wherein n and n' are zero.

6. The resin of claim 1 wherein $R^2$ contains from 1 to about 20 carbon atoms.

7. The resin of claim 6 wherein said monovalent hydrocarbon radicals are selected from alkyl radicals, aryl radicals, aralkyl radicals, alkaryl radicals, and cycloalkyl radicals.

8. The resin of claim 7 wherein said monovalent hydrocarbon radicals are selected from alkyl radicals.

9. The resin of claim 8 wherein said dihydric phenol is a 4,4'-dihydric phenol.

10. The resin of claim 9 wherein n and n' are zero.

11. The resin of claim 4 or 9 wherein said aromatic dicarboxylic acid is selected from isophthalic acid, terephthalic acid, and mixtures thereof.

* * * * *